United States Patent
Van Wageningen

(10) Patent No.: US 11,552,705 B2
(45) Date of Patent: Jan. 10, 2023

(54) INTERFERENCE-FREE SCHEDULING FOR WIRELESS OPTICAL NETWORKS WITH MULTIPLE COORDINATORS

(71) Applicant: SIGNIFY HOLDING B.V., Eindhoven (NL)

(72) Inventor: Andries Van Wageningen, Wijlre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/291,900

(22) PCT Filed: Nov. 14, 2019

(86) PCT No.: PCT/EP2019/081336
§ 371 (c)(1),
(2) Date: May 6, 2021

(87) PCT Pub. No.: WO2020/104288
PCT Pub. Date: May 28, 2020

(65) Prior Publication Data
US 2022/0006527 A1    Jan. 6, 2022

(30) Foreign Application Priority Data

Nov. 23, 2018 (EP) ..................................... 18208102

(51) Int. Cl.
*H04B 10/27* (2013.01)
*H04B 10/114* (2013.01)

(52) U.S. Cl.
CPC ......... *H04B 10/1149* (2013.01); *H04B 10/27* (2013.01)

(58) Field of Classification Search
CPC ... H04B 10/27; H04B 10/1149; H04L 1/1657; H04W 72/10
See application file for complete search history.

(56) References Cited

U.S. PATENT DOCUMENTS

2015/0208316 A1* 7/2015 Mosko ................. H04W 40/24
370/238
2015/0341130 A1* 11/2015 Zhou .................... H04W 28/18
370/336

(Continued)

FOREIGN PATENT DOCUMENTS

JP    2012508541 A    4/2012
JP    2017521898 A    8/2017

(Continued)

OTHER PUBLICATIONS

"IEEE Standard for Local and Metropolitan Area Networks: Short-Range Wireless Optical Communication Using Visible Light"; IEEE Std 802.15.7-2001, Sep. 6, 2011, pp. 1-309.

*Primary Examiner* — Dzung D Tran

(57) ABSTRACT

In a wireless optical network with multiple coordinators or other access points, the coverage area of coordinators may overlap. Interference in the communication between coordinators and devices may occur in these overlapping coverage areas. Various embodiments propose an automatic allocation of reserved time slots to coordinators. These time slots support the coordinators to advertise their presence without interference and enable a device to detect the presence of a neighbour coordinator in a single MAC cycle. Cooperation of coordinators can be supervised by a global controller to determine non-interfering time schedules whereby the coordinators rely on interference reports from the devices in the overlapping coverage areas. Fast detection allows fast re-scheduling of time slots in the wireless optical network in order to prevent interference when a device that enters the overlapping coverage area of two coordinators.

19 Claims, 9 Drawing Sheets

(56) References Cited

U.S. PATENT DOCUMENTS

2019/0090275 A1* 3/2019 Zhang ............... H04W 74/0816
2019/0124654 A1* 4/2019 Cherian ............ H04W 72/0446

FOREIGN PATENT DOCUMENTS

| WO | 2016002166 A1 | 1/2016 |
| WO | 2017156748 A1 | 9/2017 |
| WO | 2017185380 A1 | 11/2017 |
| WO | 2018001481 A1 | 1/2018 |

* cited by examiner

|    | D1 | D2 | D3 | D4 | D5 | D6 | D7 | D8 |
|----|----|----|----|----|----|----|----|----|
| C1 | O  | O  |    |    | O  | O  |    |    |
| C2 |    |    |    |    | O  |    |    |    |
| C3 | O  | O  | O  | O  |    |    |    |    |
| C4 | O  |    | O  |    |    |    | O  | O  |

Fig. 11A

|    | D1 | D2 | D3 | D4 | D5 | D6 | D7 | D8 |
|----|----|----|----|----|----|----|----|----|
| C1 | O  | X  |    |    | X  | X  |    |    |
| C2 |    |    |    |    | O  |    |    |    |
| C3 | X  | O  | X  | X  |    |    |    |    |
| C4 | O  |    | O  |    |    |    | X  | X  |

Fig. 11B

|    | D1 | D2 | D3 | D4 | D5 | D6 | D7 | D8 |
|----|----|----|----|----|----|----|----|----|
| C1 | O  | I  |    |    | I  | X  |    |    |
| C2 |    |    |    |    | O  |    |    |    |
| C3 | I  | O  | I  | X  |    |    |    |    |
| C4 | O  |    | O  |    |    |    | X  | X  |

Fig. 11C

|    | 0  | 1  | 2  | 3 | 4  | 5  | 6  | 7 | 8  | 9  | 10 | 11 | 12 | 13 | 14 | 15 |
|----|----|----|----|---|----|----|----|---|----|----|----|----|----|----|----|----|
| C1 | A1 | D2 | D5 |   | A2 | D5 | D5 |   | A3 | D1 | D5 |    | A4 |    |    |    |
| C2 | A1 |    | D5 |   | A2 | D5 | D5 |   | A3 |    | D5 |    | A4 |    |    |    |
| C3 | A1 | D2 |    |   | A2 |    |    |   | A3 | D1 | D3 |    | A4 |    |    |    |
| C4 | A1 |    |    |   | A2 |    |    |   | A3 | D1 | D3 |    | A4 |    |    |    |

Fig. 12

INTERFERENCE-FREE SCHEDULING FOR WIRELESS OPTICAL NETWORKS WITH MULTIPLE COORDINATORS

CROSS-REFERENCE TO PRIOR APPLICATIONS

This application is the U.S. National Phase application under 35 U.S.C. § 371 of International Application No. PCT/EP2019/081336, filed on Nov. 14, 2019, which claims the benefit of European Patent Application No. 18208102.6, filed on Nov. 23, 2018. These applications are hereby incorporated by reference herein.

FIELD OF THE INVENTION

The invention relates to the field of scheduling transmissions in optical wireless networks, such as—but not limited to—LiFi networks, for use in various different applications for home, office, retail, hospitality and industry.

BACKGROUND OF THE INVENTION

Wireless optical networks, such as LiFi networks (named like Wi-Fi networks), enable electronic devices like laptops, tablets, and smartphones to connect wirelessly to the internet. Wi-Fi achieves this using radio frequencies, but LiFi achieves this using the light spectrum which can enable unprecedented data and bandwidth. It's important to consider that wireless data is required for more than just our traditional connected devices—today televisions, speakers, headphones, printer's, virtual reality (VR) goggles and even refrigerators use wireless data to connect and perform essential communications. Radio frequency technology like Wi-Fi is running out of spectrum to support this digital revolution and LiFi can help power the next generation of immersive connectivity.

Visible-light communication (VLC) transmits data by intensity modulating optical sources, such as light emitting diodes (LEDs) and laser diodes (LDs), faster than the persistence of the human eye. VLC merges lighting and data communications in applications such as area lighting, signboards, streetlights, vehicles, and traffic signals. The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light for communication. Contrary to radio frequency (RF) communication, VLC typically requires a line-of-sight connection between the transmitter and the receiver.

In a star topology, the communication is established between devices and a single central controller, called the coordinator. In a peer-to-peer topology, one of two devices in an association takes on the role of the coordinator. In a coordinated topology, multiple devices communicate with multiple coordinators, supervised by a global controller. The global controller has a fixed network link to each coordinator. To scale up a system from one OWPAN to two or more OWPANs, the global controller function has been proposed to handle interference and hand-over between overlapping OWPANs. The global controller or network controller function manages the coordinators, while each coordinator controls its OWPAN. The global controller function can be connected to the coordinators via a separate network.

The above centralized approach has the disadvantage that the system relies on the availability of the central service or server, e.g., the global controller. If the global controller fails or the connection between the global controller and the coordinators fails, the coordinators lack control. Moreover, for a small system with only a few coordinators, it may also be a hurdle to install this global control service for a quick and easy installation of the system.

However, in decentralized optical wireless networks (e.g. LiFi systems or other optical communication systems covering light with wavelengths beyond the visible spectrum) without global control function, the coordinators often do not "see" each other due to the line-of-sight character between a coordinator and a connected local LiFi device. The coordinator may therefore not be able to directly measure any significant interference caused by a neighbor coordinator.

SUMMARY OF THE INVENTION

It is an object of the present invention to provide a solution for detecting and handling interference caused by a device which enters an overlapping coverage area of neighboring coordinators.

This object is achieved by a system as claimed in claim 1, an apparatus as claimed in claim 8 or 10, by an access point as claimed in claim 13, by a global controller device as claimed in claim 14, by a method as claimed in claim 16 or 17, and by a computer program product as claimed in claim 19.

According to a first aspect, a system is provided for handling interference in a wireless optical network comprising at least two access points (e.g. coordinators of a LiFi network) and at least one device (e.g. a local (mobile) device of a LiFi network) selectively associated via a line-of-sight connection to a respective one of the access points, wherein the at least one device is adapted to detect one of the at least two access points as a neighbor access point based on a reception of an advertisements in a time slot of a MAC cycle and to report neighbor detection to a local access point to which the at least one device is associated;

wherein the local access point is adapted to restrict time-slot scheduling for the at least one device to reserved time slots of the at least one device and to report the neighbor detection and the reserved time slots of the at least one device to the neighbor access point or to a global control function, in response to a reception of the reported neighbor detection; and wherein the neighbor access point is adapted to exclude the reported reserved time slots of the at least one device from time-slot scheduling of communication with associated devices of the neighbor access point, in response to a reception of the reported neighbor detection.

Accordingly, individually reserved time-slots are used for exclusive scheduling, instead of fixed reserved time periods including many time slots. The reserved time slots of the MAC cycle can be automatically allocated to the access points e.g. by the global control function of the network. These time slots support the access points to advertise their presence without interference and enable an associated device to detect the presence of a neighbor coordinator in a single MAC cycle. Based on a reported neighbor detection, neighboring access points can modify their scheduling of communication (i.e. re-schedule their communication) with respect to reserved time slots of the reporting device according to predetermined scheduling rules. The fast detection within one or a few MAC cycles allows fast re-scheduling of time slots in the wireless optical network in order to prevent interference when a device enters an overlapping coverage area of two coordinators. The neighbor detection does not have to be reported within one MAC cycle. It may be reported within e.g. 2 or 3 MAC cycles. A bit error may occur in the advertisement making it impossible for the device to detect and report the neighbor in a single cycle.

According to a first option of the first aspect, the system may be adapted to automatically allocate at least one reserved time slot of a MAC cycle to each of the access points and the at least one device for scheduling communication between the at least two access points and the at least one device. Thereby, a global allocation of reserved time slots can be provided as a starting or reset point for the proposed interference-free scheduling. According to a second option of the first aspect, which can be combined with the above first option, the system may further comprise a central control entity connected to the at least two access points via a backbone network, the central control entity comprising the global control function and being adapted to allocate the at least one reserved time slot of the MAC cycle to each of the access points and the at least one device for scheduling communication between the at least two access points and the at least one device. Thereby, a central scheduling approach by the central control entity (e.g. a global controller or the like) is provided to increase efficiency and reliability of slot allocation and further reduce interference probability.

According to a third option of the first aspect, which can be combined with the above first or second option, the system may be adapted to combine reserved time slots of a plurality of devices that have reported detection of the same neighbor access point or any neighbor access point and that are associated to the local access points to a set of combined reserved time slots of the MAC cycle, and wherein the local access point or the global controller function is adapted to report the set of combined reserved time slots to the neighbor coordinator for exclusion from scheduling. Thereby, the system can be simplified and processing power for calculating non-interfering schedules can be reduced. A first set may thus be obtained by combining reserved time slots for devices that report detection of the same neighbor, and a second set may be obtained by combining reserved time slots for devices that report detection of any neighbor. According to a fourth option of the first aspect, which can be combined with the above first or second option, the system may be adapted to combine all time slots reserved for an access point for communication with all associated devices of the access point to a set of combined reserved time slots of the MAC cycle, and wherein the access point or the global controller function is adapted to report the set of combined reserved time slots to the neighbor coordinator for exclusion from the time-slot scheduling. Thereby, the system can be simplified even more and processing power for calculating non-interfering schedules can be further reduced.

According to a fifth option of the first aspect, which can be combined with the above first or second option, the system may be adapted to allocate an arbitrary continuous reserved time period including a plurality of time slots of the MAC cycle to an access point for communication with all associated devices, and wherein the access point or the global controller function is adapted to report the reserved time period to the neighbor coordinator for exclusion from the time-slot scheduling. Thereby, the system can be simplified even more by allocating whole reserved time periods for all associated devices of an access point, so that processing power for calculating non-interfering schedules can be further reduced, while some degree of flexibility with regard to the location of the time period within the MAC cycle can be maintained.

According to a sixth option of the first aspect, which can be combined with the above first to fifth options, the global controller function may be adapted to obtain information about traffic load of the at least one access points and to determine based on the traffic load the number of reserved time slots for allocation to the local access point for scheduling communication with a device in the coverage area of the neighbor access point. This allows the global controller function to optimize the allocation of time slots based on the individual operating conditions and resultant traffic demand at the access points.

According to a second aspect directed to a local access point (e.g. a local coordinator of a LiFi network), an apparatus is provided for handling interference in a wireless optical network comprising at least two access points and at least one device selectively associated via a line-of-sight connection to a respective one of the access points, wherein the apparatus is adapted to restrict time-slot scheduling for the at least one device to allocated reserved time slots of a MAC cycle of the at least one device and to report a neighbor detection and the reserved time slots of the at least one device to a neighbor access point or to a global control function, in response to a reception of a neighbor detection report from the at least one device.

According to a first option of the second aspect, the apparatus may be adapted to provide a time stamp indicating the most recent neighbor detection report of the at least one device, and to release the scheduling restriction for the at least one device in response to a determination based on the time stamp that a predetermined time period has expired since the most recent neighbor detection report of the at least one device. Thereby, unnecessary scheduling restrictions can be released in cases where it is very likely that the reporting device has left the overlapping coverage area between neighbor access points.

According to a third aspect directed to a reported neighbor access point (e.g. a neighbor coordinator of the LiFi network), an apparatus is provided for handling interference in a wireless optical network comprising at least two access point and at least one device selectively associated via a line-of-sight connection to a respective one of the access points, wherein the apparatus is adapted to receive from a neighbor access point or from a global controller function a neighbor detection report including reserved time slots of a MAC cycle of a reporting device and to exclude the reported reserved time slots of the reporting device from time-slot scheduling of communication with associated devices.

According to a first option of the second or third aspect, the apparatus may be adapted to receive from the global controller function information about an allocation of at least one time slot of a MAC cycle for the time-slot scheduling. Thereby, a global allocation of reserved time slots can be provided as a starting or reset point for the proposed interference-free scheduling.

According to a second option of the second or third aspect, which may be combined with the first option of the second or third aspect, the apparatus may be adapted to release the exclusion of a reported reserved time slot, if this time slot no longer appears in an update report received from the neighbor access point or from the global controller function. Thereby, the available number of time slots can be maximized based on the actual situation of devices in overlapping coverage areas.

According to a fourth aspect, a global controller device (e.g. a global controller or a server with a global control function) is provided for automatically allocating at least one reserved time slot of a MAC cycle to each of the access points and the at least one device of the system of the above first aspect. According to a first option of the fourth aspect, a local access point function (120) may be provided for receiving from the local access point the neighbor detection report and for reporting the neighbor detection including identification information and the reserved slots of the reporting device to a neighbor access point function of the global controller device. Thus, the functionalities of the proposed interference-free scheduling can be implemented as different functions (e.g. software routines) on the global controller device. The functions may be distributed over physical access points, or may be distributed over separate running tasks or threats, or may be executed by different routines of a single task or threat, or may be executed by a single routine.

According to a fifth aspect directed to a procedure at a local access point (e.g. a local coordinator of a LiFi network), a method is provided for handling interference in a wireless optical network comprising at least two access points and at least one device selectively associated via a line-of-sight connection to a respective one of the access points, the method comprising:

responsive to a reception of a neighbor detection report from the at least one device:

restricting time-slot scheduling for the at least one device (30) to reserved time slots of a MAC cycle of the at least one device; and reporting a neighbor detection and the reserved time slots of the at least one device to a neighbor access point or to the global control function.

According to a sixth aspect directed to a procedure at a reported neighbor access point (e.g. a neighbor coordinator of a LiFi network), a method is provided for handling interference in a wireless optical network comprising at least two access points and at least one device selectively associated via a line-of-sight connection to a respective one of the access points, the method comprising:

receiving from a neighbor access point or from a global controller function a neighbor detection report including reserved time slots of a MAC cycle of a reporting device; and excluding the reported reserved time slots of the reporting device from time-slot scheduling of communication with associated devices.

According to a first option of the fifth or sixth aspect, the method may further comprise receiving from the global controller function information about an allocation of at least one reserved time slot of the MAC cycle for the time-slot scheduling. Thereby, a global allocation of reserved time slots can be provided as a starting or reset point for the proposed interference-free scheduling.

According to a sixth aspect, a computer program product may be provided, which comprises code means for producing the steps of the above methods of the fourth or fifth aspects when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the system of claim 1, the apparatus of claim 8 or 10, the access point of claim 13, the global controller device of claim 14, the method of claim 16 or 17, and the computer program product of 19 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIGS. 11A to 11C show respective tables for illustrating coordinator detections, device associations and neighbor coordinator detections; and FIG. 12 shows a table for illustrating an interference-free slot allocation example.

DETAILED DESCRIPTION OF EMBODIMENTS

Embodiments of the present invention are now described based on a LiFi network environment with coordinators having overlapping coverage areas.

The following embodiments are directed to an allocation of reserved time channels or reserved time slots.

Figure 1:
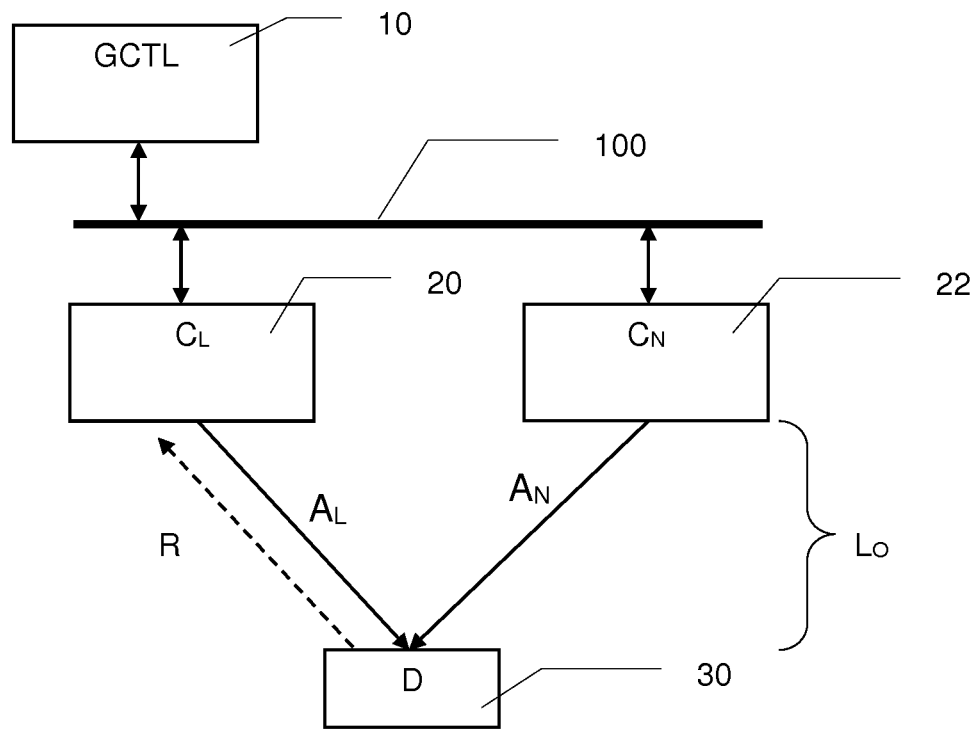
FIG. 1 shows a schematic architecture of a wireless optical network with a global control function, in which various embodiments can be implemented.

FIG. 1 shows a schematic network architecture with communication facilities for interference handling based on a coordinated topology. A local coordinator (CL) 20 and at least one neighbor coordinator (CN) 22 are adapted to emit their advertisements $A_L$, $A_N$ and to receive reports R to/from at least one associated end device 30 via optical links $L_O$. Additionally, the coordinators 20, 22 are connected via a fixed wired backbone network 100, to which a global controller (GCTL) 10 may optionally be connected as well. As the optical links $L_O$ between the coordinators 20, 22 and the associated end devices may be implemented with a certain directivity, it is very likely that there is no line-ofsight connection between the coordinators 20, 22 and thus no direct communication between them by means of optical links.

To become an associated device, the device 30 needs to do a network discovery and initiate a network join process. This is usually done when the device 30 is first started and is not associated with any network. Once the network discovery is finished and a potential parent (e.g. the local coordinator 20) has been selected by the device 30 e.g. based on its advertisement $A_L$, the device 30 will start the network join process by issuing a network join request. The network join request will call a MAC's association service and issue an association request to the potential parent. When the device 30 has received a network join response and the join was successful, it will update its network and MAC information tables to include the new network address of the wireless optical network and also update its neighbor table to specify its new parent.

It is noted that FIG. 1 shows a simplified network architecture with only two coordinators and only one device.

To mitigate interference in the example of FIG. 1, the local coordinator 20 should react fast when the local (end) device 30 enters the coverage area of the neighbor coordinator 22. It is therefore important that the local device 30 detects the neighbor coordinator 22 in a fast manner. To enable such fast detection, the coordinator 20 and the neighbor coordinator 22 may send their advertisements $A_L$, $A_N$ on different slots of a globally aligned Medium Access Control (MAC) cycle.

Figure 2:
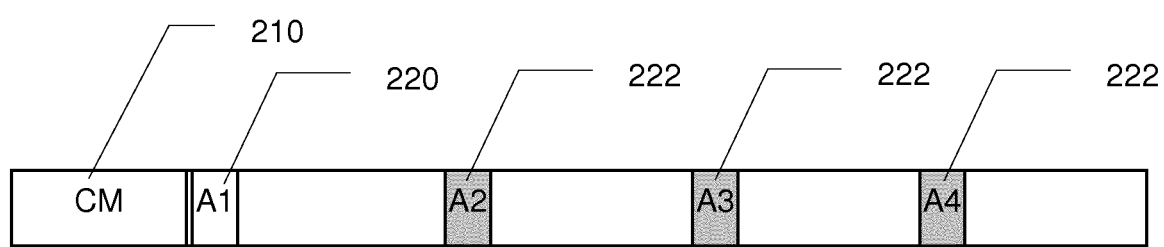
FIG. 2 shows a schematic representation of a MAC cycle with reserved coordinator time slots.

FIG. 2 shows an example of a MAC cycle for a coordinator with an initial common field (CM) 210. The common field 210 can be used by the coordinator for a first type of advertisements in time slots at which contention with neighboring coordinators may occur. The allocated time for the common field can be increased in the configuration mode to keep the probability that the advertisements collide acceptably low when the frequency of sending the first type of the advertisements is increased. According to various embodiments, a first slot (A1) 220 is reserved for the coordinator 20 and further subsequent slots (A2-A4) 222 are reserved for its neighbor coordinators, e.g., the neighbor coordinator 22 in FIG. 1.

Such reserved time channels or time slots for coordinator advertisements can be allocated by a central approach or by a distributed approach, wherein the distributed approach may or may not involve a communication between the coordinators 20, 22.

Various embodiments therefore focus on an automatic allocation of at least one reserved time slot per coordinator for advertising its presence with a minimum of interference, wherein a local device (e.g. device 30 in FIG. 1) is to be understood as a device associated to a local coordinator (e.g. local coordinator 20 in FIG. 1), an interference device is to be understood as a device that has detected presence of a local coordinator and a neighbor coordinator, and a neighbor coordinator (e.g. neighbor coordinator 22 in FIG. 1) is to be understood as a coordinator with a coverage area that overlaps with that of the local coordinator. The overlapping coverage area of the local coordinator and the neighbor coordinator can be defined as the area in which a local device can receive advertisements from the neighbor coordinator in addition to the communication with the local coordinator.

Figure 3:
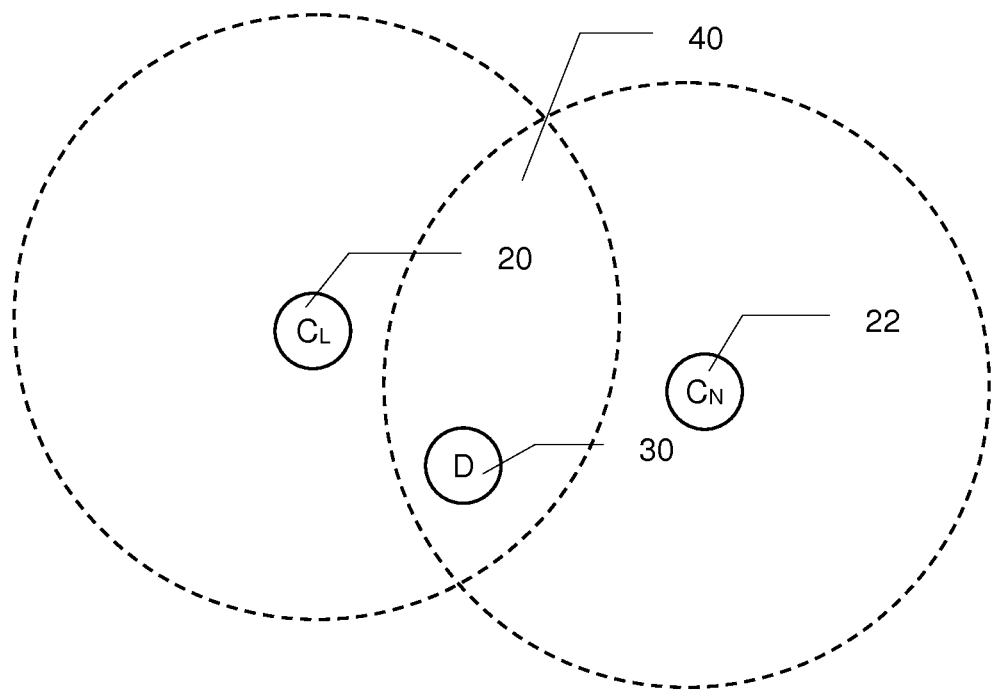
FIG. 3 shows a schematic representation of two coverage areas of neighboring coordinators with an overlapping area.

FIG. 3 schematically shows coverage areas of two neighboring coordinators. The boarders of these coverage areas are indicated as dashed circles. The overlapping portion of these coverage areas indicates the overlapping coverage area 40.

According to a so-called cooperative scheduling approach, it is assumed that, in a pre-configuration, each of the coordinators 20, 22 of FIG. 1 has been assigned ownership of a time channel in the MAC cycle such that the two neighboring coordinators 20, 22 always have different time channels (pre-configuration). Each of the coordinators 20, 22 may then reserve a basic time period (e.g. time slot) in its owned time channel to establish interference free communication with devices in its reach. Each of the coordinators 20, 22 applies a dedicated advertisement period that falls within the basic reserved time slot in which it broadcasts its presence to devices in its reach, e.g., the local device 30. Then, a device in reach of the two of more coordinators 20, 22 receives their respective advertisements AL, AN at separate time slots of the MAC cycle and reports back the detection of multiple coordinators in a dedicated period of its report R. As an example, a dedicated slot may by allocated for each coordinator 20, 22 in a MAC cycle for sending its advertisements.

However, if the pre-configuration is absent in the above cooperative scheduling approach, or the network changes, e.g., by adding a new coordinator or by removing a screen between the two coordinators 20, 22, a mechanism is needed to establish or modify the time channel allocations. For example, if the two coordinators 20, 22 are hidden by a screen, they may have been allocated the same time channel and so they may send their respective advertisements $A_L$, $A_N$ at the same time. If the screen is removed, they may need a re-allocation of time channels for the handling.

In the following, different interference handling approaches are explained based on the schematic network architecture shown in FIG. 1

In a central approach with collection of neighbor relationships, each of the coordinators 20, 22 communicates and updates its neighbor coordinator detection results via the backbone network 100 to the global controller 10. The global controller 10 determines a time channel for each of the coordinators 20, 22 and communicates the result to them. When the global controller 10 has provided a time channel to all coordinators, the global controller 10 broadcasts a trigger to set the communicated time channels into operation. The coordinators 20, 22 then start using the corresponding time channels e.g. for their advertisements $A_N$, $A_L$.

Furthermore, in a distributed approach with communication (i.e. information exchange via the backbone network 100), each of the coordinators 20, 22 first collects neighbor relations with a neighbor detection process. This can be achieved in that each of the coordinators 20, 22 synchronously runs an iteration process thereby taking the following two steps at each iteration. In the first step, the coordinator calculates a weight factor for itself and its neighbors not having a channel allocated. If it has the maximum weight, it chooses a time channel and broadcasts this allocation. In the subsequent second step, the coordinator updates its neighborhood information and broadcasts an update message containing information for calculating weight factors.

Additionally, a distributed approach without communication relies on the detection of interference. In a first step, each of the coordinators 20, 22 initially allocates an equal probability to each time channel (e.g. 1/c where c corresponds to the number of channels). Then, in a second step, one of the coordinators 20, 22 chooses a time channel with weighted probability and measures the interference level to determine if this choice was successful. If successful, it sets the probability for this time channel to "1" and for the other time channels to "0". If not successful, it decreases the probability with a certain factor for this time channel and re-distributes the reduction of this weight evenly over the other time channels. Finally, the procedure returns to the second step.

The above distributed approach with communication may need extensive time-consuming and load-increasing communication between the coordinators. The above distributed approach without communication overcomes this problem but depends on the determination of an interference level. In the envisioned LiFi systems, coordinators often do not "see" each other due to the line-of sight character between a coordinator and a connected local LiFi device. A coordinator can therefore not directly measure any significant interference caused by a neighbor coordinator.

Furthermore, the above distributed approach without communication may need a high number of iteration steps before reaching a final resolution. A worst-case scenario would be that a LiFi system is in full operation with many devices assigned to the LiFi-network and then a condition changes causing two neighbor coordinators to detect their neighborhood. Such a change may propagate to the other coordinators, leading to many iterations until a final set of time channels is reached. Such an iterative change of time channels may however disturb the interference handling based on the above cooperative scheduling approach.

According to various embodiments, a neighbor coordinator detection process is proposed, which makes use of type 1 advertisements sent in time slots at which contention with neighbor coordinators may occur. These type 1 advertisements are sent randomly in time e.g. during the common period 210 of FIG. 2, which is intended for contention access of the coordinators only and not for the devices. In various embodiments, it may be sufficient to restrict use of the type 1 advertisements to advertising presence and identity of a coordinator in the common period 210. However, the common period is just an example. In principle, any part of the MAC cycle may be assigned for exclusive contention access of coordinators.

Optionally, an additional interference detection process may be provided for type 2 advertisements sent in allocated reserved time slots. A coordinator maintains at least one time slot for that purpose.

Furthermore, a reserved time slot allocation process is proposed, where a reserved time slot is intended to be contention-free with a minimum of interference from neighbor coordinator communication. For the reserved time slot allocation process a central and distributed approach may be combined to overcome the disadvantages of each and make use of the advantages of each.

As already mentioned above, the central approach has the advantage that it can determine an optimal allocation of reserved time slots since it collects all necessary information at one place (e.g. the global controller 10 in FIG. 1). Moreover, it can keep the iterations hidden before reaching the final solution, so that it will not disturb the interference handling process during this iteration process. It further reduces the communication overhead for each iteration step.

The distributed approach provides the advantage of not relying on a central server (e.g. the global controller 10 in FIG. 1). If a central server fails or loses connection to the coordinators for a certain time, the coordinators can continue to operate. The distributed algorithm can be relaxed in the sense that the reserved slots it allocates do not have to be completely contention free, because the central server can repair these short comes when it is available again.

Further, the number of time slots from which the distributed process may choose may be higher than the minimum number of time slots necessary to achieve non-interfering time slots for the neighbour coordinators. If the central server additionally allocates the minimum amount of interference-free time slots, it makes the spare time slots free for the distributed allocation process.

A combination of the central approach and the distributed approach allows to simplify the distributed algorithm as well as the number of iterations to find an acceptable intermediate solution for the time that the central service is not available. Therefore, a simple distributed algorithm for coordinators as well as a way of combining it with the central approach can be provided.

Figure 4:
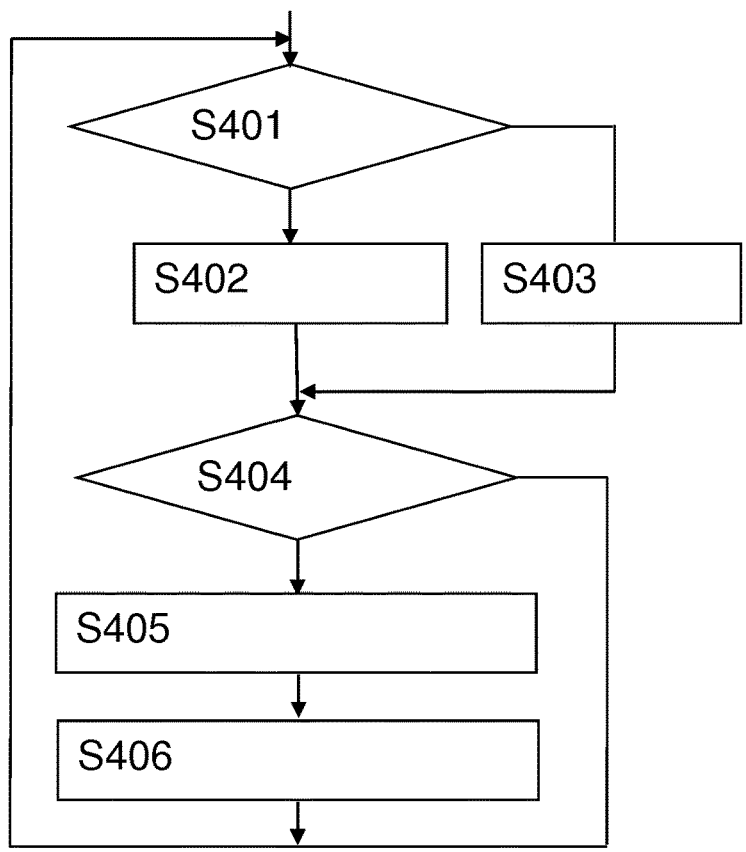
FIG. 4 shows a flow diagram of a neighbor coordinator detection procedure.

FIG. 4 shows a flow diagram of a neighbor coordinator detection process which may be implemented in a coordinator in various embodiments. It is an automatic continuously running process to detect the presence of neighbor coordinators when a local device is in the coverage area of a neighbor coordinator.

The process is described with reference to the network architecture of FIG. 1.

The coordinators 20, 22 communicate with each other and with the global controller 10 via the backbone 100. Furthermore, the coordinators 20, 22 communicate with the local device 30 or other devices via the optical links $L_o$.

Each of the coordinators 20, 22 sends type 1 advertisements randomly in time. In step S402, it is determined whether the network is in the normal operation mode (and not in the configuration mode). If the network is in the normal operation, the procedure continues with step S402 and the type 1 advertisements are sent relatively spare over time, e.g., once every predetermined number N of MAC cycles. Otherwise, if the network is in the configuration mode (no normal data traffic), the procedure branches to step S403 where the type 1 advertisements are sent with a higher density in time, e.g., M times every MAC cycle.

When the local device 30 detects a type 1 advertisement of the neighbor coordinator 22, it sends a report R about this detection to the local coordinator 20.

In step S404, it is determined whether such a report R has been received. If not, the procedure jumps back to the start at step S401. If a report R has been received, the procedure continues at step S405 and the local coordinator 20 reports this detection to the neighbor coordinator 22. Additionally, if the global controller 10 is present (i.e. in a centralized configuration), the coordinator 20 additionally reports the detection of the neighbor coordinator 22 to the global controller 10 in step S405. These reports are labeled as type 1 reports.

Finally, in step S406, both coordinators 20, 22 update their list of neighbor coordinators and the global controller 10 may update its repository or database according to reported neighbor coordinator relations.

For the installation (or modification) of a LiFi-network, an installer can set all coordinators into the configuration mode (e.g. via the global controller 10) and walk with a device in the coverage area of the LiFi network thereby choosing locations at which coordinators are expected to have overlapping coverage. This will enable the coordinators or the global controller to quickly learn the neighbor coordinator relations.

Figure 5:
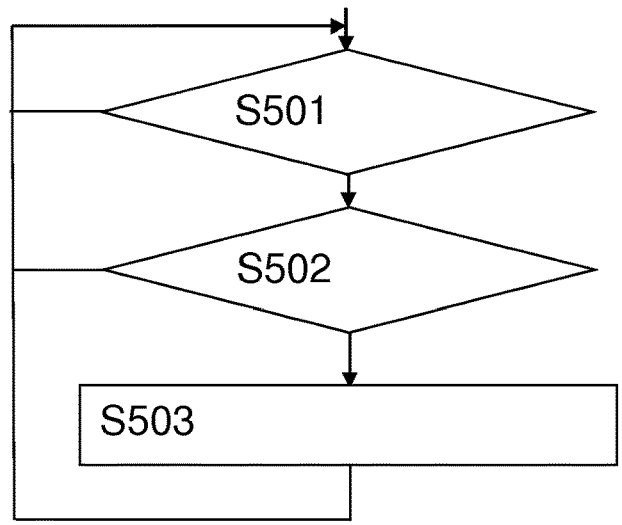
FIG. 5 shows a flow diagram of an interference detection procedure.

FIG. 5 shows a flow diagram of an interference detection process which can be implemented in various embodiments. It is an automatic continuously running process to detect if a data transfer in a reserved time slot is potentially interfered by a neighbor coordinator. Again, the process is described with reference to the network architecture of FIG. 1.

Each of the coordinators 20, 22 sends type 2 advertisements in a reserved time slot. In step S501, the local device waits until it has received a type 2 advertisement. If a type 2 advertisement has been received, the procedure continues with step S502 where it is checked if the received type 2 advertisement suffers from interference. The local device 30 may be adapted to determine the decision to report interference based on a degradation of the type 2 advertisements. For example, the signal-to-noise (S/N) ratio of an advertisement may be below a certain threshold, and/or the local device 30 was not able to decode the advertisement in N MAC cycles (e.g. with N being a number between 1 and 10, for example).

If no interference is decided in step S502, the procedure jumps back to step S501 and waits for the next type 2 advertisement. Otherwise, if a sufficient degree of interference has been determined in step S502, the procedure continues with step S503 and the local device 30 reports this interference via a report R to the local coordinator 20. These reports R are labeled as type 2 reports.

Figure 6:
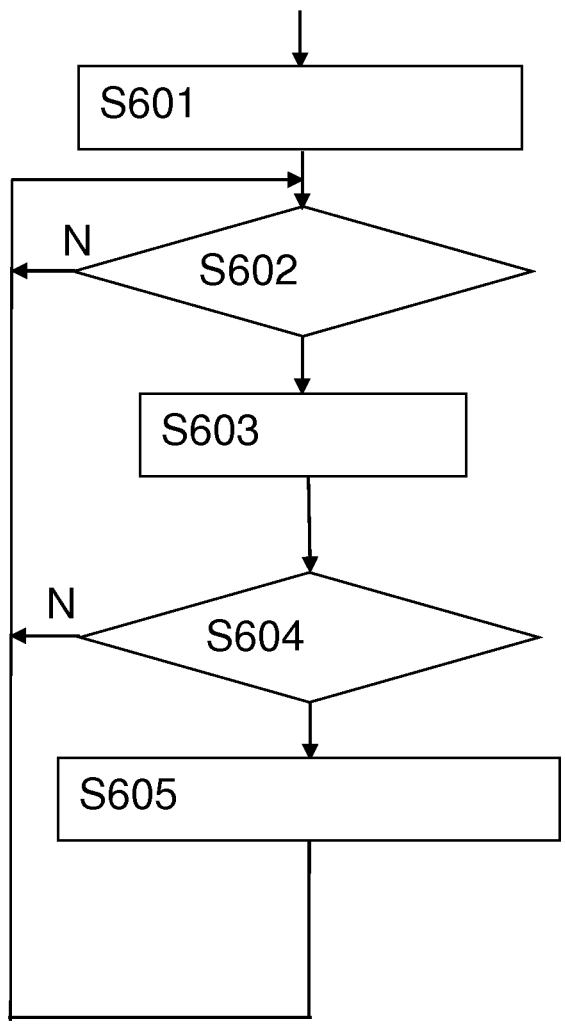
FIG. 6 shows a flow diagram of a distributed process to allocate a reserved time slot according to a first embodiment.

FIG. 6 shows a flow diagram of a distributed process to allocate a reserved time slot according to a first embodiment which can be combined with any one of the above procedures of FIGS. 4 and 5. Again, the process is described with reference to the network architecture of FIG. 1.

Each of the coordinators 20, 22 keeps track on which neighbor coordinator has allocated which reserved time slot. Based on this information, it determines for each time slot a neighbor occupancy level. Optionally, it may increase the occupancy level if it detects that the time slot suffers high interference from an unknown neighbor coordinator (e.g. based on a type 2 report of FIG. 5).

More specifically, in an initial step S601, the local coordinator 20 marks all time slots (of a predetermined set of time slots) of the MAC cycle to be not occupied and randomly allocates a reserved time slot.

Then, in step S602, the coordinator 20 waits for the reception of a report R from the local device 30 or another local device. Optionally, on reception of a type 2 report, the coordinator 20 temporarily increases the occupancy for the reserved time slot and starts a reserved time slot allocation update in step S603 and proceeds to step S604.

If the local coordinator has received a type 1 report in step S602, the local coordinator 20 and the neighbor coordinator 22 update their neighbor relations by exchanging their currently allocated time channels in step S603.

Then, in step S604, both coordinators 20, 22 determine if they have the same reserved time slot(s) allocated (i.e. same reserved time channels). If so, the procedure proceeds to step S605 where an arbitrary one of the coordinators 20, 22 performs a reserved time slot allocation update and the other one waits for the reception of a new report (i.e., returns to step S602).

More specifically, in step S605, the arbitrary one of the coordinators 20, 22 determines which slots are least occupied and randomly reserves one of them. If the arbitrary one of the coordinators 20, 22 changes its reserved time slot allocation, it informs its neighbor coordinators about this change. Then, the procedure returns to step S602 and the arbitrary one of the coordinators 20, 22 waits for the reception of a new report.

It is noted that only a single iteration may be applied for each report.

In a modification of the first embodiment, the above procedure of FIG. 6 may be varied in that the total occupancy level may be considered in step S604. E.g., on reception of a type 1 report in step S602, the local coordinator 20 and the neighbor coordinator 22 may update their neighbor relations by exchanging their current allocated time channels. If it is determined in step S604 that the local coordinator 20 and the neighbor coordinator 22 have the same reserved time channel allocated, the one with the lowest total occupancy level (and, if equal, an arbitrary one of them) performs the reserved time slot allocation update in step S605 and the other one directly proceeds to step S602 and waits for the reception of a new report.

Additionally, in another modification of the first embodiment, the above procedure of FIG. 6 may be combined with the central approach, as follows:

The coordinators 20, 22 run a distributed process as described above in connection with FIG. 6. In addition, each of the coordinator 20, 22 forwards the reports R it receives from the local device 30 or other local devices to the global controller 10. If the global controller 10 responds with an update of the reserved time slot allocation, the respective one of the coordinators 20, 22 applies this update in step S605. If the connection to the global controller 10 fails (e.g. a time-out occurs), the respective one of the coordinator 20, 22 itself determines the update for the reserved time slot allocation in step S605.

The global controller 10 may keep each of the coordinators 20, 22 up-to-date on the reserved time slot allocations of its neighbor coordinators in steps S603 and/or S605.

As an alternative, the global controller 10 may keep each of the coordinators 20, 22 up-to-date on the reserved time slot allocations and the total occupancy level of its neighbor coordinators in steps S603 and/or S605.

As a further alternative, the global controller 10 may initially determine the reserved time slots and the neighbor occupation for each of the coordinators 20, 22 and may communicate the result to each of the coordinators 20, 22. Then, the coordinators 20, 22 may run the distributed process of FIG. 6. If one of the coordinators 20, 22 detects that all time slots (of its predefined set) are occupied, it requests an update from the global controller 10.

As a still further alternative, the global controller 10 may limit the allocation of reserved time slots to a smaller set than the distributed process of FIG. 6. For example, the global controller 10 may limit itself to a set of e.g. four time slots while the coordinators 20, 22 may choose from a set of e.g. six time slots.

In the following, a second embodiment is described based on a cooperation of coordinators supervised by a global controller to determine non-interfering time schedules whereby the coordinators rely on interference reports from the devices in the overlapping coverage areas.

In the second embodiment, the global controller 10 of FIG. 1 is configured to allocate reserved time slots to the coordinators 20, 22. The advertisements $A_L$, $A_N$ broadcast by the coordinators 20, 22 are taking place in the reserved time slots of the MAC cycle. It is left open where other management communication (like device reporting or the other data traffic) will take place in the MAC cycle. The second embodiment relies on the communication between the coordinators 20, 22 over the backbone network 100, meaning that the device 30 only needs to report via its optical uplink to its associated local coordinator 20 but not to neighbor coordinators, such as the neighbor coordinator 22. In addition to the communication of the detection of the neighbor coordinator 22, information about the reserved time slots can also be communicated over the backbone network 100.

It is assumed that neighbor relations have been established for the coordinators 20, 22, that the global controller 10 knows the neighbor relations of the coordinators 20, 22 and each of the coordinators 20, 22 knows its neighbor coordinators. Furthermore, it is assumed that the coordinators 20, 22 have their MAC cycles aligned, meaning that the start time and the duration of each MAC cycle is (almost) equal for each of the coordinators 20, 22.

The second embodiment focuses on handling devices (e.g. the device 30 in FIG. 1) that are exposed to a local coordinator (e.g. the local coordinator 20 in FIG. 1) and at least one neighbor coordinator (e.g. the neighbor coordinator 22 in FIG. 1). More specifically, a fast process for detecting when a device is in the overlapping coverage area of the local coordinator and a neighbor coordinator is proposed, which enables fast re-scheduling of time slots when the device moves into the overlapping coverage area. This fast detection and rescheduling process is based on a few rules that enables the coordinators to make local decisions to realize interference-free schedules.

To achieve this, the following slots are defined and used in the second embodiment:

A-slots: Reserved slots for advertising;
D-slots: Reserved slots for local devices;
Subset of D-slots: Selection of one or multiple D-slots.

Figure 7:
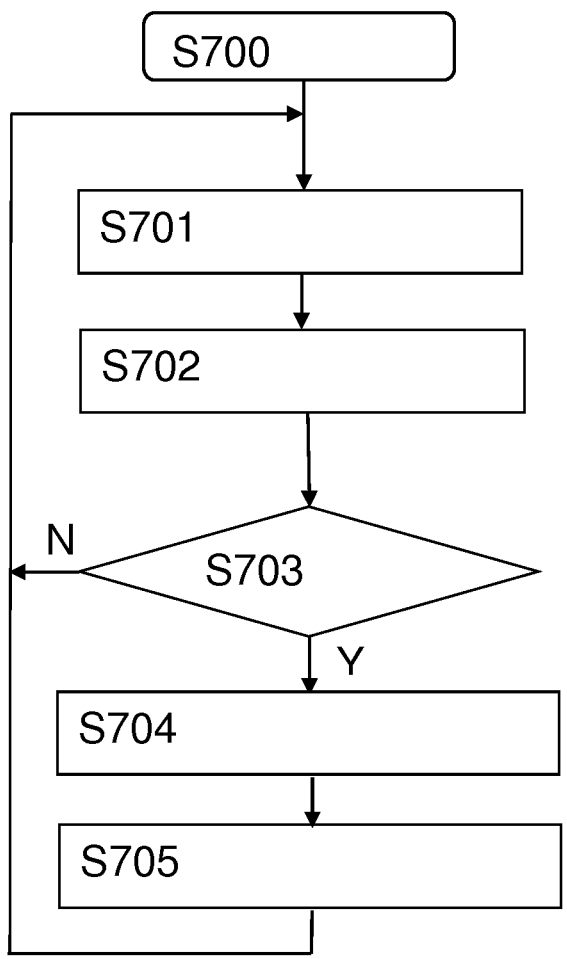
FIG. 7 shows a flow diagram of a centralized process for interference-free scheduling according to a second embodiment.

In the following, a process for interference-free scheduling at the coordinators according to the second embodiment is described based on a flow diagram shown in FIG. 7 with reference to the network architecture of FIG. 1.

Initially, in step S700, the global controller 10 allocates at least one A-slot and a set of D-slots to each of the coordinators 20, 22 thereby using the assumed established knowledge on neighbor relations of the coordinators 20, 22.

Then, in step S701, each of the coordinators 20, 22 advertises its presence including an identification indication in its allocated A-slot(s).

Furthermore, in step S702, each of the coordinators 20, 22 excludes all A-slots of neighboring coordinators from its time slots available for scheduling based on corresponding information received from the global controller 10 or from neighbor coordinators.

In the subsequent step S703, the coordinator 20 checks whether it has received from one of its associated devices (e.g. the device 30) a report about a detected neighbor coordinator (e.g. the neighbor coordinator 22).

When an advertisement of the neighbor coordinator 22 or other neighbor coordinators is received by the device 30 associated to the local coordinator 20, it reports the identifier of the neighbor coordinator 22 to the local coordinator 20 in a time slot scheduled by the local coordinator 20.

If it is determined in step S703 that no report has been received, the procedure jumps back to step S701 and the coordinator 20 continues advertising and scheduling based on the latest information received from the global controller 10.

Otherwise, if it is determined in step S703 that a report about a new neighbor coordinator has been received e.g. from the device 30 upon the detection of neighbor coordinator 22, the local coordinator 20 decides in step S704 to restrict the scheduling of time slots for reporting device 30 to a subset of D-slots and to report this subset to the neighbor coordinator 22. It is noted that it can also be a new device that reports the same neighbor coordinator as the device 30. Thus, it does not necessarily have to be a new neighbor coordinator that is reported.

Finally, in step S705, the neighbor coordinator 22 restricts scheduling for all its registered devices by excluding the subset of D-slots reported by the neighbor coordinator 20 for the reporting device 30.

Then, after step S705, the procedure jumps back to step S701 and the coordinators 20 and 22 continue advertising and scheduling based on the present situation and corresponding information received from the global controller 10 or from neighbor coordinators.

To summarize, the following scheduling rules are applied by the coordinators 20, 22 in the second embodiment:
1. For interference-free scheduling of advertisements in A-slots, independently of the position of (associated) devices in the network:
a. The local coordinator 20 schedules its advertisements in its allocated A-slots (cf. step S701 of FIG. 7); and
b. Any neighbor coordinator excludes scheduling anything in A-slots allocated to the local coordinator 20 (cf. step S702 of FIG. 7).
2. The following scheduling rules are applied by the coordinators 20, 22 for interference-free scheduling of other data, if a local device is determined to be in the coverage area of a neighbor coordinator:
a. The local coordinator 20 restricts its schedule for this local device to a subset of D-slots allocated to the device (cf. step S704 of FIG. 7):
b. The neighbor coordinator 22 restricts the schedule for all its registered devices by excluding this subset of D-slots (cf. step S705 of FIG. 7).

Thus, the scheduling rules are no longer restricted to apply on complete periods, but rather on individually reserved time-slots. This enables more flexibility to reduce the probability that time slots are assigned without being used. Because the global controller 10 gets more control on allocating individual reserved time slots to the coordinators 20, 22, it can influence the coordinators in more detail. This helps to achieve better utilization of the time slots in the MAC cycle by letting neighbor coordinators re-use more of the same time slots. The overall network performance can therefore be improved especially when data traffic is influenced by the coordinator changes and the global controller 10 re-balances the available network resources in reaction to such changes. Furthermore, the freedom remains to allocate bundles of reserved time slots to the coordinators to reduce complexity, which then still allows simplified implementations.

The global controller 10 stores information about neighbor relations of the coordinators 20, 22 and thus knows for each coordinator the overlapping area of neighbor coordinators. Based on this knowledge, it can allocate A-slots for advertisements to the coordinators 20, 22 via the backbone network 100.

Each of the coordinators 20, 22 advertises its presence including an identification indication in its allocated A-slot(s) on the optical downlink of the optical medium with its optical links $L_o$. The identification information enables to identify the coordinator 20 to its neighbor coordinators (e.g. the neighbor coordinator 22 among others).

A device (e.g. the device 30 in FIG. 1) associated to the local coordinator 20 (and in communication with this local coordinator 20) reports a neighbor coordinator detection to the local coordinator 20 on the optical uplink of the optical medium when it receives advertisements e.g. of the neighbor coordinator 22 on the optical downlink of the optical medium. In response, the local coordinator 20 reports the device's neighbor detection to the neighbor coordinator 22 including its identification information and its allocated reserved D-slots for that device. Alternatively, the local coordinator 20 may report to the global controller 10, which then forwards the report to the neighbor coordinator 22.

Optionally, the local coordinator 20 may keep track of each device that has recently reported a neighbor coordinator detection, e.g. by adding a time stamp indicating the most recent report of the device. If a predetermined time period has expired since the latest report, the local coordinator no longer regards the device to be exposed to the reported neighbor coordinator and therefore releases the scheduling restriction for this device. The local coordinator 20 keeps its neighbor coordinator 22 up-to-date on the actual reserved D-slots that are relevant for the neighbor coordinator 22. The neighbor coordinator 22 releases the restriction for its associated devices for those D-slots that are no longer relevant.

If the global controller 10 gets additional information about the traffic load of the local coordinator 20 and the neighbor coordinator 22, it can determine the number of D-slots that the local coordinator 20 may use for exclusive scheduling communication with devices in the coverage area of the neighbor coordinator 22. For example, if the neighbor coordinator 22 has low data traffic demand it may operate well by scheduling only a few D-slots. In that case, the global controller 10 can allocate a relatively high number of D-slots to the local coordinator 20 to be reserved for local devices in the coverage area of the neighbor coordinator 22.

However, if the processing power for calculating non-interfering schedules is limited at the coordinators 20, 22 or the global controller 10, the following simplification of the above scheduling rules can be applied:

A first simplification can be achieved by combining the subsets of D-slots for local devices that are in the coverage area of a neighbor coordinator to a combined set of D-slots that then applies for all these devices. The local controller then communicates the combined set of D-slots to the neighbor coordinator and the neighbor coordinator excludes the combined set from its scheduling of communication with its associated devices.

A second simplification can be achieved by combining the subset of D-slots for the local devices that are in the coverage area of any neighbor coordinator to an enhanced combined set of D-slots that then applies for all these devices. The local controller then communicates the enhanced combined set of D-slots to the neighbor coordinator and the neighbor coordinator excludes the enhanced combined set from its scheduling of communication with its associated devices.

A third simplification can be achieved by using the whole set of D-slots allocated to the coordinator. The local controller then communicates the whole set of D-slots to the neighbor coordinator and the neighbor coordinator excludes the whole set of D-slots from its scheduling of communication with its associated devices.

A fourth simplification can be achieved by allocating a single period in the MAC cycle, which includes the whole set of D-slots allocated to the coordinator. Although a complete period of the MAC cycle is scheduled, there is still provided some freedom about the position of this period in the MAC cycle. The local controller then communicates this period to the neighbor coordinator and the neighbor coordinator excludes this period from its scheduling of communication with its associated devices.

The functionality per coordinator for the above interference rules to achieve interference free-scheduling can be implemented in software running on a processor that is physically part of the coordinator.

In an alternative architecture, the software of the functionality per coordinator for the above interference rules to achieve interference free-scheduling may run on a server, whereby e.g. a task or thread may represent coordinator functionalities. Moreover, it is also possible to apply a distributed algorithm whereby the above functionalities can be realized by running a separate software task/thread for each coordinator. The function of the global controller for the allocation of A-slots and D-slots to the coordinators can be implemented in a software function running on a server but may also be implemented as a distributed function running on the coordinators.

Figure 8:
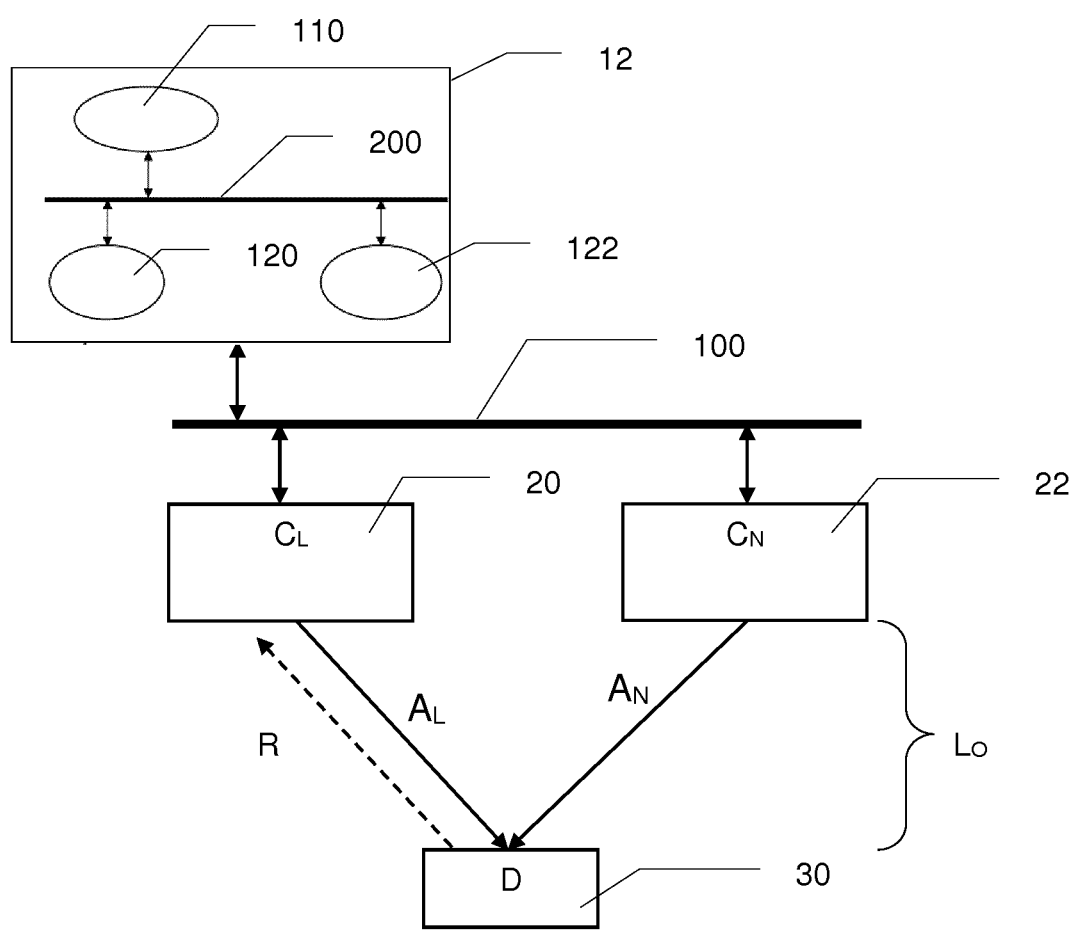
FIG. 8 shows a schematic architecture of a wireless optical network with a server-based global control function, in which various embodiments can be implemented.

FIG. 8 shows a schematic architecture of a wireless optical network with a server-based interference handling function, in which various embodiments can be implemented.

The system of FIG. 8 illustrates communication facilities for the interference handling in a simple system similar to the system of FIG. 1. Elements of FIG. 8 which correspond to those in FIG. 1 are not explained here. The system contains a server 12 on which the global controller function for allocation of A-slots and D-slots to the coordinators 20, 22 as well as the functionality per coordinator for the above interference rules to achieve interference-free scheduling is implemented, for multiple coordinators 20, 22 (only two are shown for illustration) and multiple devices 30 (only one is shown for illustration).

Contrary to the system of FIG. 1, scheduling functions are implemented by respective tasks 110, 120 and 122 on the server 12 to realize interference free-scheduling by communication via a server-internal software- or hardware-based communication structure 200. The global controller task 110 allocates reserved time slots (A- and D-slots) for the controller tasks 120 and 122 based on previously established controller neighbor relationships. The local coordinator 20 reports a device's neighbor detection to a local controller task 120 on the server. The local controller task 120 reports the device's neighbor detection including identification information and the allocated reserved slots for the reporting device (e.g. device 30 in FIG. 8) to a neighbor coordinator task 122. Alternatively, the local coordinator 20 reports to a global controller task 110 which then forwards the report to the neighbor coordinator tasks 122.

Figure 9:
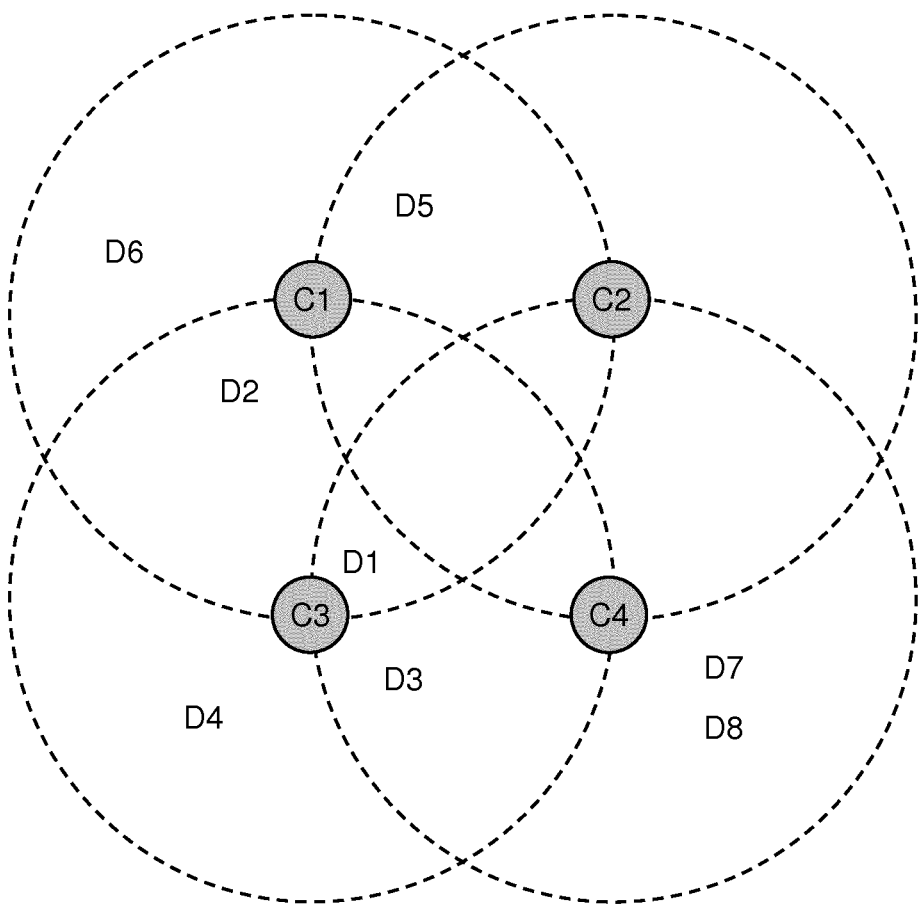
FIG. 9 shows an exemplary network architecture with four coordinators and eight devices.

FIG. 9 shows an exemplary network architecture with four coordinators C1 to C4 and eight devices D1 to D8. Each dashed circle indicates the coverage area of a coordinator located in the center of the coverage area. In FIG. 9, the devices D1, D2, D3 and D5 are in overlapping coverage areas of the coordinators C1 to C4, while the other devices D4, D6, D7 and D8 are in non-overlapping coverage areas.

Figure 10A:
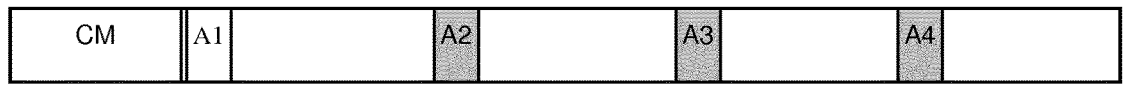
FIGS. 10A to 10C show schematic representations of respective MAC cycles for neighboring coordinators with reserved time slots for advertisements and data traffic.
Figure 10A:
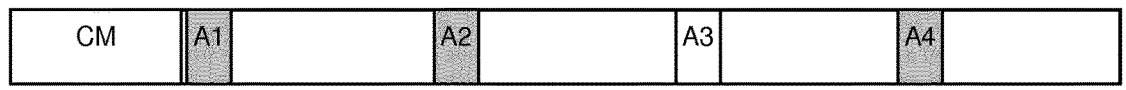
Figure 10B:
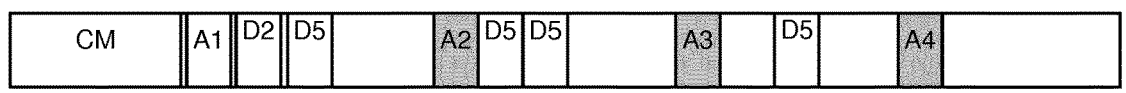
Figure 10B:
Figure 10C:
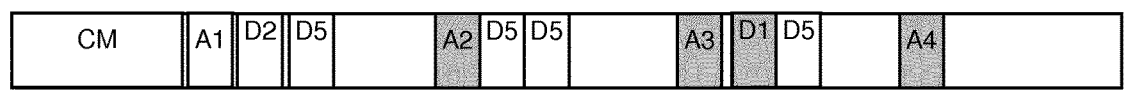
Figure 10C:

FIGS. 10A to 10C show schematic representations of respective MAC cycles for the neighbor coordinators C1 and C3 of FIG. 9 with reserved time slots for advertisements and data traffic, respectively. In FIGS. 10A to 10C, own reserved slots of the respective coordinator are colored white, while restricted slots which are not usable by the respective coordinator are colored grey.

FIG. 10A shows examples of MAC cycles for coordinators C1 and C3, respectively, including advertisement slots (A-slots) A1 to A4. In this example, one A-slot is allocated to each of the coordinators C1 to C4 for exclusive use, i.e., a first A-slot A1 is allocated to coordinator C1, a second A-slot A2 is allocated to coordinator C2, a third A-slot A3 is allocated to coordinator C3, and a fourth A-slot A4 is allocated to coordinator C4).

The upper MAC cycle of FIG. 10A belongs to coordinator C1 which uses the first A-slot A1 (which is therefore colored white in FIG. 10A) for advertising its presence and avoids scheduling anything in the other A-slots A2 to A4 (which are therefore colored grey in FIG. 10A). The lower MAC cycle of FIG. 10A belongs to coordinator C3 which uses the third A-slot A3 (which is therefore colored white in FIG. 10A) for advertising its presence and avoids scheduling anything in the other A-slots A1, A2 and A4 (which are therefore colored grey in FIG. 10A). The same applies for the coordinators C2 and C4. Their MAC cycles are however not shown in FIGS. 10A to 10C.

The global controller (function) assigns the A-slots to the coordinators C1 to C4. Alternatively, the coordinators C1 to C4 may have knowledge about their respective neighbor coordinators and may determine the A-slots themselves using a distributed algorithm.

FIG. 10B shows examples of MAC cycles for coordinators C1 and C3, respectively, now also including data traffic slots (D-slots) for coordinator C1.

It is assumed that devices D2 and D5 are associated to coordinator C1 which is therefore the local coordinator of devices D2 and D5. Furthermore, as can be gathered from FIG. 9, devices D2 and D5 are located in an overlapping area. Namely, device D2 is also located in in the coverage area of neighbor coordinator C3, and device D5 is also located in the coverage area of neighbor coordinator C2. Therefore, the corresponding scheduling rules for D-slots need to be applied.

Device D2 receives advertisements from neighbor coordinator C3 and reports to its local coordinator C1 that it is in the coverage area of neighbor coordinator C3. In response, local coordinator C1 reports the reserved slots for the reporting device D2 to neighbor coordinator C3 and restricts its schedule for device D2 to these reserved slots. Neighbor coordinator C3 restricts its schedule for its associated devices (assumed to be devices D1, D3 and D4) by excluding the reserved slots for device D2. Accordingly, in the upper MAC cycle of FIG. 10B (which belongs to local coordinator C1), a D-slot is exclusively reserved for its associated device D2 and therefore colored white.

Additionally, in the lower MAC cycle of FIG. 10B (which belongs to neighbor coordinator C3), the D-slot reserved for device D2 is excluded from scheduling and therefore colored grey.

The other associated device D5 of local coordinator C1 receives advertisements from neighbor coordinator C2 and reports to its local coordinator C1 that it is in the coverage area of neighbor coordinator C2. In response, local coordinator C1 reports to neighbor coordinator C2 the reserved slots for reporting device D5 and restricts its schedule for reporting device D5 to these reserved slots. As can be gathered from the upper MAC cycle of FIG. 10B, local coordinator C1 has exclusively reserved four D-slots for its other associated device D5 in an overlapping coverage area. Since neighbor coordinator C2 has no associated device, the global controller can assign a relatively large set of reserved D-slots to device D5.

Although not shown in the lower MAC cycle of FIG. 10B, the other neighbor coordinator C3 may optionally restricts its schedule for potential to be associated devices by excluding the D-slots reserved for device D5.

FIG. 10C shows examples of MAC cycles for coordinators C1 and C3, respectively, now also including D-slots for coordinator C3.

It is assumed that devices D1, D3 and D4 are associated to coordinator C3, while device D1 is in the coverage areas of coordinators C1 and C3, and device D3 is in the coverage areas of coordinators C3 and C4.

Device D1 receives advertisements from neighbor coordinator C1 and reports to its local coordinator C3 that it is in the coverage area of neighbor coordinator C1. In response, local coordinator C3 reports to neighbor coordinator C1 the reserved slots for reporting device D1. Thus, local coordinator C3 restricts its schedule for its associated device D1 to these reserved slots. Accordingly, in the lower MAC cycle of FIG. 10C (which belongs to local coordinator C3), a D-slot is exclusively reserved for its associated device D1 and therefore colored white.

The neighbor coordinator C1 restricts its schedule for its associated devices (assumed to be D2, D5 and D6) by excluding the reserved slots for D1. Accordingly, in the upper MAC cycle of FIG. 10C (which belongs to neighbor coordinator C1), the D-slot reserved for device D1 is excluded from scheduling and therefore colored grey.

Furthermore, associated device D3 receives advertisements from the other neighbor coordinator C4 and reports to its local coordinator C3 that it is in the coverage area of neighbor coordinator C4. In response, local coordinator C3 reports to neighbor coordinator C4 the reserved slots for reporting device D3 and restricts its schedule for reporting device D3 to these slots. Accordingly, in the lower MAC cycle of FIG. 10C (which belongs to local coordinator C3), a D-slot is also exclusively reserved for its associated device D3 and therefore colored white.

Additionally, neighbor coordinator C4 restricts its schedule for its associated devices (assumed to be devices D7 and D8) by excluding the reserved slots of device D3.

It is noted that in the above example devices D5 and D3 can be scheduled in the same time slots without causing any interference, as they are located in different overlapping areas.

FIGS. 11A to 11C show respective tables for illustrating coordinator detections, device associations and neighbor coordinator detections.

The table of FIG. 11A illustrates detections of the coordinators C1 to C4 of FIG. 9 by the devices D1 to D8, wherein a mark "O" is placed at the crossing of a coordinator row and a device column of the table if the respective device has detected the respective coordinator. Thus, as indicated in the table of FIG. 11A, devices D1, D2, D5 and D6 have detected coordinator C1, device D5 has detected coordinator C2, devices D1 to D4 have detected coordinator C3, and devices D1, D3, D7 and D8 have detected coordinator C4.

In addition to the table of FIG. 11A, the table of FIG. 11B illustrates associations of the devices D1 to D8 to the coordinators C1 to C4 of FIG. 9, wherein a mark "X" is placed at the crossing of a coordinator row and a device column of the table if the respective device is associated to the respective coordinator. Thus, as indicated in the table of FIG. 11B, devices D2, D5 and D6 are associated to coordinator C1, no device is associated to coordinator C2, devices D1, D3 and D4 are associated to coordinator C3, and devices D7 and D8 are associated to coordinator C4.

In addition to the table of FIG. 11B, the table of FIG. 11C illustrates neighbor coordinator detections by local associated devices, wherein a mark "I" is placed at the crossing of a coordinator row and a device column of the table if the respective device has detected the respective coordinator as neighbor coordinator. Thus, as indicated in the table of FIG. 11C, devices D2 and D5 have detected coordinator C1 as neighbor coordinator, no device has detected coordinator C2 as neighbor coordinator, devices D1 and D3 have detected coordinator C3 as neighbor coordinator, and no device has detected coordinator C4 as neighbor coordinator.

FIG. 12 shows a table for illustrating an interference-free slot allocation example.

More specifically, the table of FIG. 12 illustrates the scheduling rules of the second embodiment for each of the coordinators C1 to C4 of FIG. 9 (indicated by the first column of the table and corresponding to respective rows of the table). In this example, it is assumed that 16 slots (indicated by the first row of the table and corresponding to respective columns of the table) are available in a MAC cycle. The A-slots intended for advertising the presence of a coordinator are marked with the letter "A", while the number behind the letter corresponds to the coordinator for which the respective slot is reserved (i.e. A1 to A4). The D-slots intended for scheduling communication or data traffic with devices that are in the coverage area of a neighbor coordinator are marked with the letter "D", while the number behind the letter corresponds to the scheduled device (i.e. D1 to D8).

If a cell in the body of the table contains a symbol and the cell is colored white, this indicates that the slot of the column of the cell is allocated to the coordinator of the row of the cell.

If a cell in the body of the table contains a symbol and the cell is colored grey, this indicates that the slot of the column of the cell is not allocated to the coordinator of the row of the cell, but to a coordinator of another row.

If a cell in the body of the table contains no symbol, this indicates that the slot of the column of the concerned cell is free for scheduling communication to devices that are not in the coverage area of a neighbor coordinator.

According to the scheduling rules for interference-free scheduling of advertisements, the example of FIG. 12 leads to the following results:

Coordinator C1 advertises in slot 0, while the other coordinators C2 to C4 exclude slot 0;

Coordinator C2 advertises in slot 4 while the other coordinators C1, C3 and C4 exclude slot 4;

Coordinator C3 advertises in slot 8, while the other coordinators C1, C2 and C4 exclude slot 8; and Coordinator C4 advertises in slot 12, while the other coordinators C1, C2 and C4 exclude slot 12.

According to the scheduling rules for interference-free scheduling of other data, the example of FIG. 12 leads to the following results:

Coordinator C1 restricts scheduling for device D2 to slot 1, while neighbor coordinator C3 excludes slot 1;

Coordinator C1 restricts scheduling for device D5 to slots 2, 5, 6 and 10, while neighbor coordinator C2 excludes slots 2, 5, 6 and 10;

Coordinator C3 restricts scheduling for device D1 to slot 9, while neighbor coordinators C1 and C4 exclude slot 9; and Coordinator C3 restricts scheduling for device D3 to slot 10, while neighbor coordinator C4 exclude slot 10.

To summarize, in a wireless optical network (e.g. a LiFi network) with multiple coordinators or other access points, the coverage area of coordinators may overlap. Interference in the communication between coordinators and devices may occur in these overlapping coverage areas. Various embodiments propose an automatic allocation of reserved time slots to coordinators. These time slots support the coordinators to advertise their presence without interference and enable a device to detect the presence of a neighbor coordinator in a single MAC cycle. Cooperation of coordinators can be supervised by a global controller to determine non-interfering time schedules whereby the coordinators rely on interference reports from the devices in the overlapping coverage areas. Fast detection allows fast re-scheduling of time slots in the wireless optical network in order to prevent interference when a device that enters the overlapping coverage area of two coordinators.

While the invention has been illustrated and described in detail in the drawings and foregoing description, such illustration and description are to be considered illustrative or exemplary and not restrictive. The invention is not limited to the disclosed embodiments. The proposed interference detection and handling procedures can be applied to and possibly standardized in other types of wireless networks and with other types of time frames and control fields. Moreover, the invention can be applied in any type of network devices that implement the role of a coordinator or the role of an associated device, respectively.

A completely distributed approach or a partially or completely centralized approach may be used for scheduling and interference handling. In the completely centralized approach, the central control entity (e.g. global controller may determine the local schedule for each access point (e.g. coordinator) and each of the access points may then simply follow the schedule derived from the central control entity. As an alternative, certain local scheduling decisions may be kept at the access points. An initial testing of the proposed scheduling functionality may be provided by introducing virtual access points. The idea is to run a software representing the scheduling and interference handling functionality of an access point on the same hardware as used for the access point.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 4 to 6 and 8 can be implemented as program code means of a computer program and/or as dedicated hardware of the commissioning device or luminaire device, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A system for handling interference in a wireless optical network comprising at least two access points and at least one device selectively associated via a line-of-sight connection to a respective one of the access points,
wherein the at least one device is adapted to detect one of the at least two access points as a neighbor access point based on a reception of an advertisement in a time slot of a Medium Access Control, MAC, cycle and to report neighbor detection to a local access point to which the at least one device is associated;
wherein the local access point is adapted to restrict time-slot scheduling for the at least one device to reserved time slots of the at least one device and to report the neighbor detection and the reserved time slots of the at least one device to the neighbor access point or to a global control function, in response to a reception of the reported neighbor detection; and
wherein the neighbor access point is adapted to exclude the reported reserved time slots of the at least one device from time-slot scheduling of communication with associated devices of the neighbor access point, in response to a reception of the reported neighbor detection.

2. The system of claim 1, wherein the system is adapted to automatically allocate at least one reserved time slot of a Medium Access Control, MAC, cycle to each of the access points and the at least one device for scheduling communication between the at least two access points and the at least one device.

3. The system of claim 2, further comprising a central control entity connected to the at least two access points via a backbone network, the central control entity comprising the global control function and being adapted to allocate the at least one time slot of the MAC cycle to each of the access points and the at least one device for scheduling communication between the at least two access points and the at least one device.

4. The system of claim 1, wherein the system is adapted to combine reserved time slots of a plurality of devices that have reported detection of the same neighbor access point or any neighbor access point and that are associated to the local access points to a set of combined reserved time slots of the MAC cycle, and wherein the local access point or the global controller function is adapted to report the set of combined reserved time slots to the neighbor coordinator for exclusion from scheduling.

5. The system of claim 1, wherein the system is adapted to combine all reserved time slots reserved for an access point for communication with all associated devices of the access point to a set of combined reserved time slots of the MAC cycle, and wherein the access point or the global controller function is adapted to report the set of combined reserved time slots to the neighbor coordinator for exclusion from the time-slot scheduling.

6. The system of claim 1, wherein the system is adapted to reserve a continuous time period including a plurality of time slots of the MAC cycle to an access point for communication with all associated devices, and wherein the access point or the global controller function is adapted to report the reserved time period to the neighbor coordinator for exclusion from the time-slot scheduling.

7. The system of claim 1, wherein the global controller function is adapted to obtain information about traffic load of the at least one access points and to determine based on the traffic load the number of reserved time slots for allocation to the local access point for scheduling communication with a device in the coverage area of the neighbor access point.

8. A global controller device for automatically allocating at least one reserved time slot of a Medium Access Control, MAC, cycle to each of the access points and the at least one device of a system as claimed in claim 1.

9. The global controller device of claim 8, further comprising a local access point function for receiving from the local access point the neighbor detection report and for reporting the neighbor detection including identification information and the reserved slots of the reporting device to a neighbor access point function of the global controller device.

10. An apparatus for handling interference in a wireless optical network comprising at least two access points and at least one device selectively associated via a line-of-sight connection to a respective one of the access points,
wherein the apparatus is adapted to restrict time-slot scheduling for the at least one device to reserved time slots of a Medium Access Control, MAC, cycle of the at least one device and to report a neighbor detection and the reserved time slots of the at least one device to a neighbor access point or to a global control function, in response to a reception of a neighbor detection report from the at least one device.

11. The apparatus of claim 10, wherein the apparatus is adapted to provide a time stamp indicating the most recent neighbor detection report of the at least one device, to release the scheduling restriction for the at least one device, and to report an update on the reserved time slots to the neighbor access point or the global control function, in response to a determination based on the time stamp that a predetermined time period has expired since the most recent neighbor detection report of the at least one device.

12. The apparatus of claim 10, wherein the apparatus is adapted to receive from the global controller function or from a neighbor access point information about an allocation of at least one reserved time slot of the MAC cycle for the time-slot scheduling.

13. The apparatus of claim 12, wherein the apparatus is adapted to release the exclusion of a reported reserved time slot, if this time slot no longer appears in an update report received from the neighbor access point or from the global controller function.

14. An access point of a wireless optical network, comprising an apparatus as claimed in claim 10.

15. An apparatus for handling interference in a wireless optical network comprising at least two access points and at least one device selectively associated via a line-of-sight connection to a respective one of the access points,
wherein the apparatus is adapted to receive from a neighbor access point or from a global controller function a neighbor detection report including reserved time slots of a Medium Access Control, MAC, cycle and to exclude the reported reserved time slots from time-slot scheduling of communication with associated devices.

16. A method of handling interference in a wireless optical network comprising at least two access points and at least one device selectively associated via a line-of-sight connection to a respective one of the access points, the method comprising:
responsive to a reception of a neighbor detection report from the at least one device:
restricting time-slot scheduling for the at least one device to reserved time slots of a Medium Access Control, MAC, cycle of the at least one device; and reporting a neighbor detection and the reserved time slots of the at least one device to a neighbor access point or to the global control function.

17. The method of claim 16, further comprising receiving from the global controller function or from one of the at least two access points information about an allocation of at least one reserved time slot of the MAC cycle for the time-slot scheduling.

18. A non-transitory computer readable medium storing instructions when executed by one or more processors cause the one or more processors to perform the method of claim 16.

19. A method of handling interference in a wireless optical network comprising at least two access points and at least one device selectively associated via a line-of-sight connection to a respective one of the access points, the method comprising:
   receiving from a neighbor access point or from a global controller function a neighbor detection report including reserved time slots of a Medium Access Control, MAC, cycle of a reporting device; and
   excluding the reported reserved time slots of the reporting device from time-slot scheduling of communication with associated devices.

* * * * *